(12) United States Patent
Bracken et al.

(10) Patent No.: US 9,262,890 B2
(45) Date of Patent: Feb. 16, 2016

(54) CUSTOMIZING PLAYER-GENERATED AUDIO IN ELECTRONIC GAMES

(75) Inventors: Andrew E. Bracken, Foster City, CA (US); Kurt B. Kellenberger, Foster City, CA (US); Christopher C. Braymen, Foster City, CA (US)

(73) Assignee: SONY COMPUTER ENTERTAINMENT AMERICA LLC, San Mateo, CA (US)

( * ) Notice: Subject to any disclaimer, the term of this patent is extended or adjusted under 35 U.S.C. 154(b) by 941 days.

(21) Appl. No.: 12/313,297

(22) Filed: Nov. 18, 2008

(65) Prior Publication Data

US 2010/0120533 A1    May 13, 2010

Related U.S. Application Data

(63) Continuation-in-part of application No. 12/291,330, filed on Nov. 7, 2008.

(51) Int. Cl.
| | |
|---|---|
| *A63F 13/00* | (2014.01) |
| *G07F 17/34* | (2006.01) |
| *A63F 13/54* | (2014.01) |
| *A63F 13/30* | (2014.01) |
| *A63F 13/87* | (2014.01) |
| *A63F 13/63* | (2014.01) |
| *G07F 17/32* | (2006.01) |

(52) U.S. Cl.
CPC .............. *G07F 17/34* (2013.01); *A63F 13/12* (2013.01); *A63F 13/54* (2014.09); *A63F 13/63* (2014.09); *A63F 13/87* (2014.09); *G07F 17/323* (2013.01); *G07F 17/3227* (2013.01)

(58) Field of Classification Search
CPC ......... A63F 13/12; A63F 13/54; A63F 13/63; A63F 13/87
USPC ..................................................... 463/35, 42
See application file for complete search history.

(56) References Cited

U.S. PATENT DOCUMENTS

| | | |
|---|---|---|
| 5,149,104 A | 9/1992 | Edelstein |
| 5,556,107 A | 9/1996 | Carter |
| RE36,574 E | 2/2000 | Hochstein et al. |
| 6,241,612 B1 | 6/2001 | Heredia |
| 6,529,585 B2 | 3/2003 | Ng |

(Continued)

FOREIGN PATENT DOCUMENTS

WO    WO 2007/110618 A1    10/2007

OTHER PUBLICATIONS

Shane McGlaun, "Automated Smack Talking for Your Xbox 360, Gaming," Oct. 2, 2006.

(Continued)

*Primary Examiner* — Lawrence Galka
(74) *Attorney, Agent, or Firm* — Lewis Roca Rothgerber Christie LLP

(57) ABSTRACT

Methods and apparatuses for customizing player-generated audio in electronic games are provided. Sound generated by a player may be recorded in an audio clip. A modification is selected by a player, and the modification is applied to the audio clip. The modified audio clip is associated with a game event designated by the player. When the designated game event is detected, the associated audio clip may be played. In some embodiments, playing the modified audio clip includes broadcasting the modified audio clip to another player in a network.

19 Claims, 4 Drawing Sheets

(56) References Cited

U.S. PATENT DOCUMENTS

| | | |
|---|---|---|
| 6,905,414 B2 | 6/2005 | Danieli et al. |
| 6,908,389 B1 * | 6/2005 | Puskala .......................... 463/40 |
| 6,963,839 B1 * | 11/2005 | Ostermann et al. ........... 704/260 |
| 7,090,582 B2 * | 8/2006 | Danieli et al. .................. 463/35 |
| 7,107,110 B2 | 9/2006 | Fay et al. |
| 7,169,996 B2 | 1/2007 | Georges et al. |
| 7,277,870 B2 | 10/2007 | Mourad et al. |
| 7,371,175 B2 * | 5/2008 | Gilboy et al. ................... 463/35 |
| 7,376,475 B2 | 5/2008 | Fay et al. |
| 7,383,497 B2 | 6/2008 | Glenner et al. |
| 7,386,356 B2 | 6/2008 | Fay et al. |
| 7,444,194 B2 | 10/2008 | Fay et al. |
| 7,451,177 B1 | 11/2008 | Johnson et al. |
| 7,478,047 B2 | 1/2009 | Loyall et al. |
| 7,498,504 B2 | 3/2009 | Bourgeois |
| 2002/0007276 A1 * | 1/2002 | Rosenblatt et al. ........... 704/260 |
| 2004/0024822 A1 * | 2/2004 | Werndorfer et al. .......... 709/206 |
| 2005/0043097 A1 * | 2/2005 | March et al. .................... 463/42 |
| 2005/0059434 A1 * | 3/2005 | Hong ............................. 455/567 |
| 2006/0095262 A1 | 5/2006 | Danieli |
| 2006/0154683 A1 * | 7/2006 | Umezawa et al. ............. 455/518 |
| 2007/0021145 A1 * | 1/2007 | Lam ............................ 455/556.1 |
| 2007/0268312 A1 | 11/2007 | Marks et al. |
| 2008/0090659 A1 * | 4/2008 | Aguilar et al. .................. 463/42 |
| 2008/0125222 A1 * | 5/2008 | Okubo ............................ 463/35 |
| 2009/0082100 A1 * | 3/2009 | Zalewski ........................ 463/29 |
| 2010/0113160 A1 * | 5/2010 | Belz et al. ....................... 463/42 |
| 2010/0120532 A1 | 5/2010 | Bracken |

OTHER PUBLICATIONS

U.S. Appl. No. 12/291,330 Final Office Action Nov. 28, 2011.
U.S. Appl. No. 12/291,330 Office Action May 23, 2011.
U.S. Appl. No. 12/291,330 Office Action Oct. 7, 2015.

* cited by examiner

CUSTOMIZING PLAYER-GENERATED AUDIO IN ELECTRONIC GAMES

CROSS-REFERENCE TO RELATED APPLICATIONS

The present application is a continuation-in-part and claims the priority benefit of U.S. patent application Ser. No. 12/291,330 filed Nov. 7, 2008 and entitled "Incorporating Player-Generated Audio in an Electronic Game." The disclosure of this commonly owned application is incorporated herein by reference.

BACKGROUND OF THE INVENTION

1. Field of the Invention

The present invention generally relates to electronic gaming and user-generated content. More specifically, the present invention concerns the customization of user-generated audio content in an electronic gaming environment.

2. Description of the Related Art

Present networked video game play offers the ability to engage in conversation with other players. Such conversation is usually achieved through the likes of a USB- or Bluetooth®-microphone headset. The various participants in a network game will carry on conversations related to events in the game including 'smack talk' or other 'taunting' of game players. This audio exchange is heard by all other members engaged in a particular game play session.

In an instance of such 'smack talk,' one player might chastise the game play skills (or lack thereof) of another game player in response to a particularly humbling moment in game play. For example, one player might kill another game player in a military role playing game and victoriously proclaim their 'kill shot.' Similarly, one player might effectuate a vicious tackle on another player in a football game thereby resulting in a fumble. The tackling player would then announce their game play prowess to the detriment of the tackled player that also committed an embarrassing and possibly costly turnover.

Notwithstanding the ability of game players to introduce their personal commentary into networked game play and for that commentary to be heard by all other game players in a particular game session, the related art is lacking in many respects. First, a user must repeatedly interject their commentary by speaking into the microphone (headset or handheld). In a second such example, a user must make the commentary in the context of continued game play. Repeatedly introducing commentary may be complicated by a particularly difficult game situation or environment thereby making the addition of audible commentary distracting and perhaps detrimental to continued advancement in the game.

The related art is also deficient in that a user may not have access to the necessary equipment to introduce commentary during game play. For example, a user may not have a headset to allow for simultaneous game play and provisioning of commentary. A still further example instance of lacking in the art is where a user's hardware platform lacks the necessary input ports to allow for introduction of both a control device and headset notwithstanding the fact of whether the headset was available.

The art exhibits yet another lacking in that all user commentary comes directly from the user as a single voice. In certain game environments—such as a sporting game set in a large arena—'smack talk' or related user commentary may sound out of place or 'small' in the context of the overall game environment. Thus, a need clearly exists for improved methodologies for introducing customized player-generated audio into electronic games.

SUMMARY OF THE INVENTION

Embodiments of the presently claimed invention provide methods and apparatuses for customizing player-generated audio in electronic games. Sound generated by a player may be recorded in an audio clip. A modification is selected by a player, and the modification is applied to the audio clip. The modified audio clip is associated with a game event designated by the player. When the designated game event is detected, the associated audio clip may be played. In some embodiments, playing the modified audio clip includes broadcasting the modified audio clip to another player in a network.

Various embodiments of the present invention include methods for customizing player-generated audio in electronic games. Such methods may include recording sound generated by a player as an audio clip, applying a modification to the audio clip, the modification being selected by a player from a plurality of modifications, associating the modified audio clip with a game event designated by the player, and playing the modified audio clip when the associated game event is detected. The modifications may include generating dialogue for a game character, generating monster/creature sounds for game monsters/creatures, and adding music.

Further embodiments of the present invention include apparatuses for customizing player-generated audio in electronic games. Such apparatuses may include an interface configured to record sound generated by a player as an audio clip, a memory configured to store the recorded audio clip, and a processor configured to execute instructions to apply a modification to the recorded audio clip, the modification being selected by a player from a plurality of modifications, to associate modified audio clip with a game event designated by the player, and to provide the modified audio clip to a sound processing unit for play when the associated game event is detected.

Some embodiments of the present invention include computer-readable storage media embodying programs executable by a processor to perform methods for customizing player-generated audio in electronic games.

DETAILED DESCRIPTION

Figure 1:
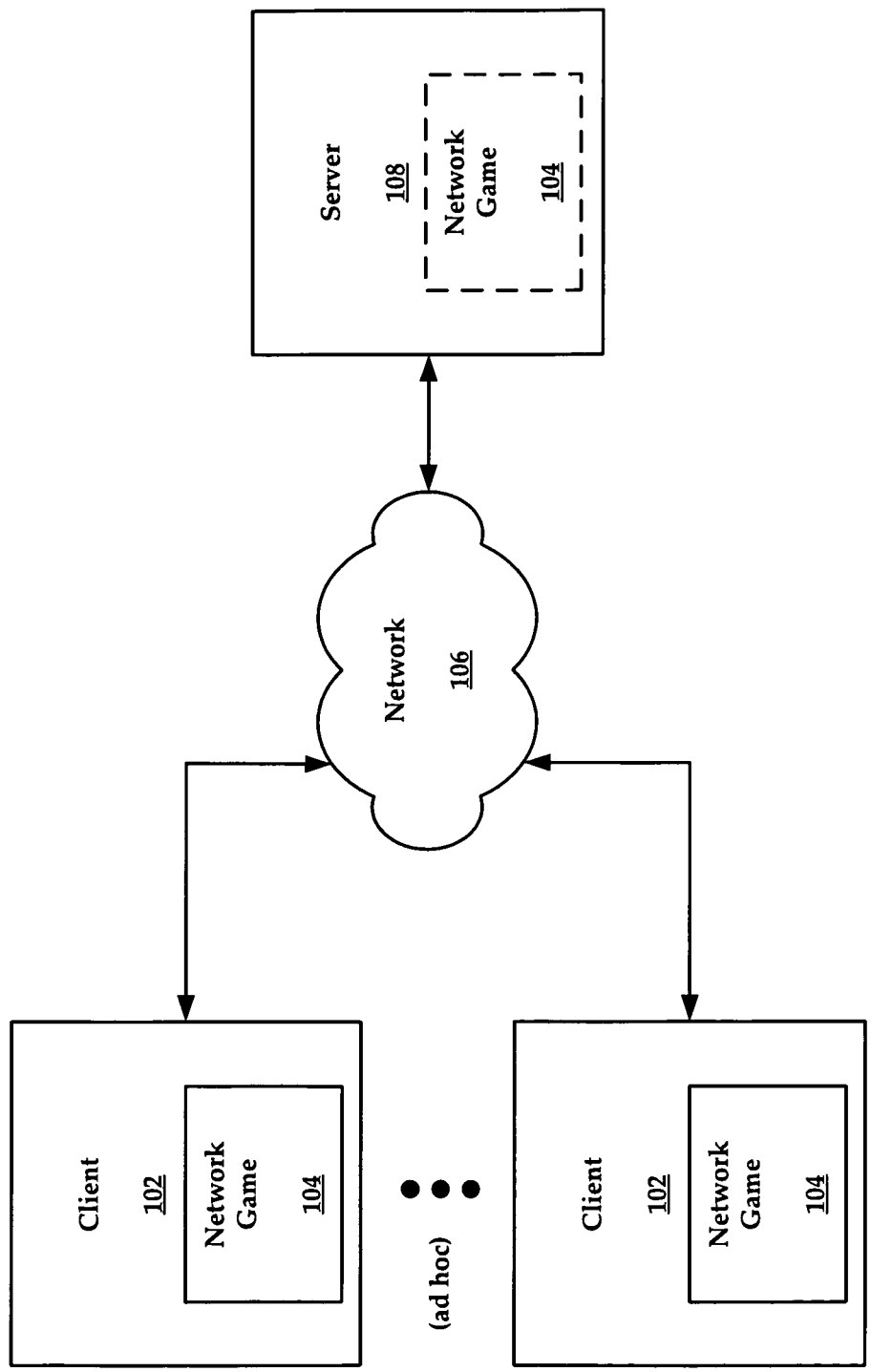
FIG. 1 illustrates an exemplary network environment for the customization of player-generated audio.

FIG. 1 illustrates a schematic diagram of an exemplary architecture for incorporating player-generated audio into an electronic game. One or more clients 102 may include one or more electronic games 104. Electronic game 104 may be built-in (e.g., pre-loaded) to the client 102 or be introduced through an optical disk or other data storage medium. Electronic game 104 may also be obtained over a network. The client 102 may be connected to a server 108 via a communications network 106 or to one another through an ad hoc network.

The client 102 may include a game console such as a PlayStation® 3, a laptop computing device, a portable game device such as the PlayStation® Portable, a desktop computing device, a cellular telephone, or any other device capable of executing the electronic game 104 and connecting to the network 106 or, alternatively, an ad hoc network. The client 102 may be identified by an identification number such as a client ID or an address mechanism such as an IP address. An electronic game player using client 102 may 'sign on' to a network with a user name and/or password, which may be temporarily or permanently associated with the client 102.

Server 108 may include the electronic game 104; clients 102 may access the electronic game 104 on the server 108 via the network 106. The electronic game 104 on the server 108 may be an entire game, a portion of the game, or data related to the game as server 108 may also be a node allowing for the pass though, observation and/or collection of data related to the game 104 as the game 104 is played by users in the game community. The electronic game 104 may be similarly organized at various clients 102 (e.g., portions of the game or game data related to the game). Electronic game 104 may also be provided through, for example, a third-party content library server. The library server may or may not be a participating member of the architecture of FIG. 1.

Reference to a client 102 and a server 108 in the context of FIG. 1 and the remainder of the present disclosure is for the convenience of understanding various embodiments of the present invention. Embodiments of the present invention may be implemented in the context of a peer-to-peer network, a client-server network, or within a peer-group (e.g. a specified group of peers). In some instances, a client may function as a server and vice versa depending on the timing and the nature of a data exchange. For example, various clients in a peer-to-peer network may each include a portion of an electronic game 104 or data related to that game 104 and may send and receive the same. As such, any reference to a client or a server is meant to be inclusive of operations performed by one or both computing entities.

The electronic game 104 may include software that may be processed on or by the client 102 and/or that allows for or facilitates communication and data exchanges with the other clients 102 and server 108 via the network 106. The network 106 may include, for example, the Internet. Other proprietary or closed networks may be used either exclusively or in conjunction with the Internet. Certain security protocols (e.g., SSL or VPN) or encryption methodologies may be used to ensure the security of data exchanges over network 106, especially if the network 106 is a publicly accessible network such as the Internet.

Electronic game players associated with each of the clients 102 may interact with other electronic game players playing the electronic game 104. Accordingly, these electronic game players, or players, at clients 102 may compete with one another despite not being physically present with one another or sharing a common gaming device or console. Electronic game 104 may include various events for which an electronic game player may customize audio.

In an electronic baseball game, for example, an event may be a home run or the seventh-inning stretch. The event could also be the appearance of a particular game character in the game such as Ryan Howard of the Philadelphia Phillies stepping up to the plate. An event may constitute a combination of individual events. For example, an event may include the appearance of a game player in conjunction with a particular event such as Ryan Howard hitting a home run.

The execution of a game event in electronic game 104 may trigger the playback of customized audio provided by the game player. Playback of the customized audio may occur on the client device 102 of the player that generated the audio. Playback of the customized audio may also be distributed over a network for playback to all other game players taking part in the particular session of game play (e.g., a player controlling the pitcher and a player controlling an outfielder).

Electronic game 104 may also provide audio processing capabilities. The player may utilize these capabilities to enhance or otherwise manipulate player-generated audio and thereby positively affect the gaming experience. For example, in the aforementioned electronic game, a player may provide a single voice audio input to client 102. The user may then apply the processing capabilities provided by execution of the electronic game 104 at client 102 to, for example, generate a crowd chant thereby creating the illusion of mass participation.

Figure 2:
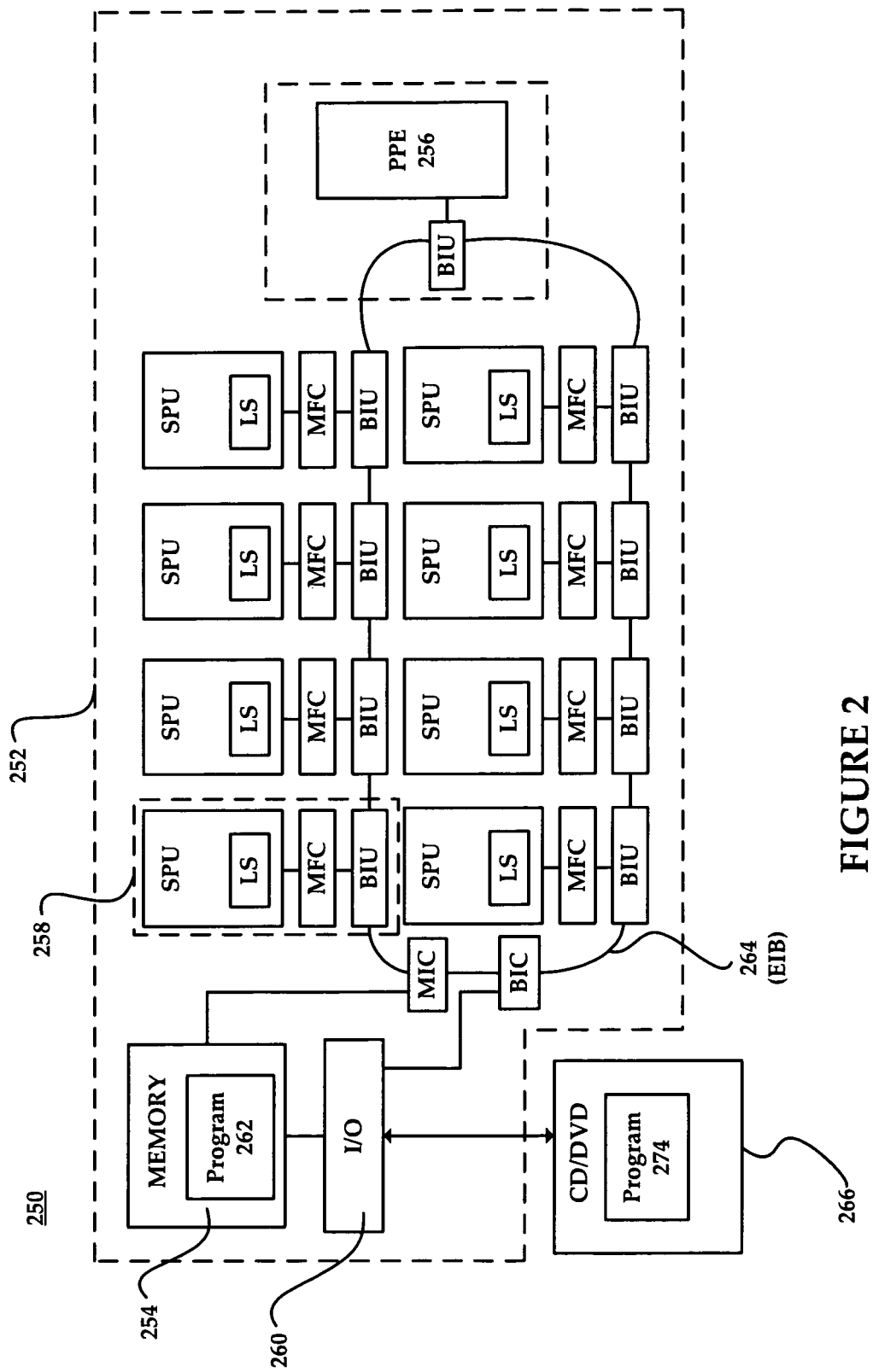
FIG. 2 illustrates a portion of an exemplary computing device that may be utilized for the customization of player-generated audio in electronic games executed in a network gaming environment, namely the processor configuration thereof.

FIG. 2 illustrates a portion of an exemplary computing device 250 that may be utilized for the introduction of player-generated audio in an electronic game executed in a network gaming environment, namely the processor configuration thereof. The exemplary computing device 250 of FIG. 2 may be implemented in the context of client 102 for playing electronic game 104. The architecture of computing device 250 may be based on a Cell processor 252. Certain aspects of a computer architecture and high speed processing model utilizing a Cell processor are disclosed in U.S. patent publication number 2002-0138637 for a "Computer Architecture and Software Cells for Broadband Networks," the disclosure of which is incorporated herein by reference.

Additional information may be found at the Cell Broadband Engine™ Public Information and Download Site (http://cell.scei.co.jp/e_download.html), specifically documentation entitled "Cell Broadband Engine™ Architecture" (V 1.01 dated Oct. 3, 2006) and "Synergistic Processor Unit (SPU) Instruction Set Architecture" (V 1.2 dated Jan. 27, 2007). The disclosure of each document is incorporated herein by reference. The Cell processor architecture represents the work of Sony Computer Entertainment Inc., Kabushiki Kaisha Toshiba, and International Business Machines Corporation.

Through the use of the aforementioned Cell processor, data and applications may be processed and packaged into uniquely identified and uniformly formatted software cells. The uniformity of structure and unique identification facilitates the processing of applications and data throughout a network of Cell processor equipped computing devices. For example, one computing device may formulate a software cell but distribute that cell to another device for processing. Thus, the cells may migrate throughout a network for processing on the basis of the availability of processing resources on the network.

The cell processor 252, in one exemplary embodiment, includes a main memory 254, a single power processor element (PPE) 256 and eight synergistic processor elements (SPE) 258. The cell processor 252 may be configured, however, with more than one PPE and any number of SPEs 258. Each SPE 258 comprises a synergistic processor unit (SPU) and a local store (LS).

Memory 254, PPE 256, and SPEs 258 may communicate with each other and with an I/O device 260 over, for example, a ring-type-element interconnect bus (EIB) 264 coupled to a bus interface controller (BIC). The PPE 256 and SPEs 258 may access the EIB 264 through bus interface units (BIU). The PPE 256 and SPEs 258 may access the main memory 254 over the EIB 264 through memory flow controllers (MFC) and memory interface controller (MIC).

Memory 254 may include a program 262 that implements executable instructions. The instructions may be read from a CD/ROM or other optical disc in CD/DVD reader 266 coupled to the I/O device 260, the CD/ROM or other optical disc being loaded into the reader 266. The CD/ROM, too, may comprise a program, executable instructions, or other data 274. Other information may be introduced to the computing device 250 through peripheral devices (not shown) such as a wireless or USB microphone headset. This information may include player-generated audio, which may then be processed by the processor 252 for distribution over a network to other client devices.

PPE 256 may be a standard processor capable of stand-alone processing of data and applications. In operation, PPE 256 may schedule and orchestrate the processing of data and applications by SPEs 258 and the associated SPU. The SPU may be a single instruction, multiple data (SIMD) processor. Under the control of PPE 256, the SPUs may process data and application in a parallel and independent manner. MIC may control accesses by PPE 256 SPUs to data and applications in main memory 254.

Figure 3:
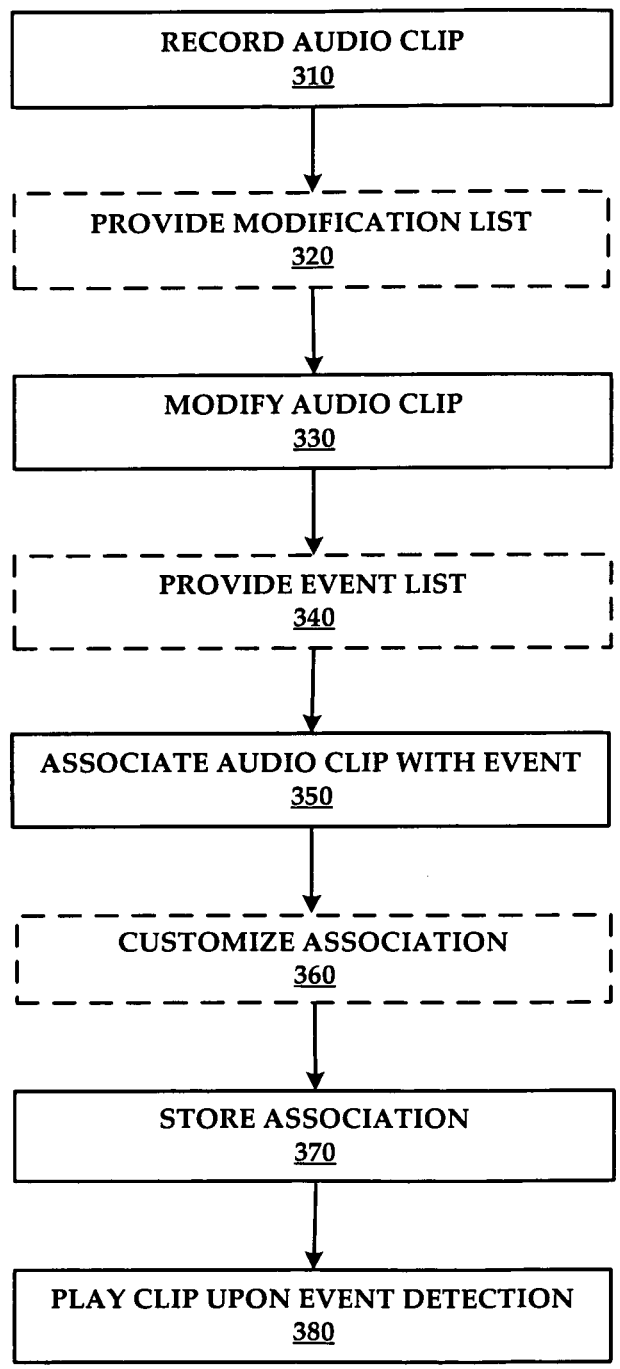
FIG. 3 illustrates an exemplary method for customizing player-generated audio in an electronic game.

Referring to method 300 of FIG. 3, in step 310, an audio clip is recorded at client 102 as generated by the player. This audio clip may be input to the client 102 and an electronic game 104 through a microphone or some other audio input device coupled to the client 104. The audio clip may also be introduced in the form of computer-readable storage media, the media having the clip stored thereon (e.g., a flash card or CD-ROM). The audio clip may be a simple phrase, a series of phrases or expressions, or may be a more complex and involved piece of content such as a song or sound track. In the latter instance, the song may be direct from a music CD that one might purchase in a store or electronic content downloaded from an on-line music provider. Audio clip may be stored directly in memory of the client 102 as may be the case when the clip is introduced through a microphone. The clip may be accessed as needed from the computer-readable medium. Clips from computer-readable storage media may also be transferred and stored on the client 102.

In some embodiments, step 310 may be conducted in the context of electronic game 104 or through a menu separate from game play such that the player has suspended game play in order to provide the audio. A recording interface may be made available to the player for recording the audio clip. Such an interface may display audio levels in a recording level meter, allow the player to start or stop the recording of an audio clip, or initiate playback of a captured audio clip such that the player may listen to the audio before accepting a recording.

In step 320, a list of possible modifications may be provided to the player for selection. A list including a plurality of such modifications may be retrieved and provided to the player. For example, upon recording an audio clip, the player may be prompted by electronic game 104 via the recording interface to provide further instructions regarding playback of the audio. This may include modification or processing in step 330 or customization of playback in electronic game 104 as may occur in step 360. Event association in step 350 may also occur via this interface.

In step 330, one or more selected modifications may be applied to the received audio clip. These modifications may occur through any number of digital signal processing techniques as are generally known in the art. For example, in step 310, a player may introduce a cheer or a chant. That cheer or chant, however, will be largely ineffective and seem out-of-place when uttered by a single user in the context of a stadium or arena environment as may be the case of a sporting game. Through the application of audio modification, however, the chant may be processed to sound as if it comes from dozens, hundreds, or thousands of other persons that might be present in the area or stadium.

Variations in tone and other acoustic properties may be applied such that the audio clip does not merely sound as if it is being uttered by hundreds of people in the exact same tone (e.g., the clip may be modified to sound as if it is being uttered by men, women, and children). These variations may be automated in the context of the game 104. For example, a user might input the audio clip and then select in a game menu an option to 'apply chant processing.' The game 104 may then execute the necessary processing to effectuate the aforementioned changes. In some embodiments, however, the game 104 may offer mixing tools where a user may manually make audio modifications to the file. These modifications may include, for example, the aforementioned addition of number of persons chanting, the environmental acoustics, the tone of the persons chanting, and the gender and age of the persons chanting. Audio clips may also be 'pre-processed' by another audio mixing application separate from the game 104 and then simply introduced to the client 102 as was the case in step 310 above.

Further modifications may also be selected by the player. Various audio special effects including echoing, fading in, fading out, changing pitch, may be applied as a modification to the audio clip. The player may further record audio for association with one or more game characters. The game characters may be male or female, young or old, human or non-human. For example, non-human game characters may include various creatures and monsters, real or fictional. Various modifications may allow the player to generate dialogue or audio that sounds appropriate for such game characters. Such dialogue and audio may further include creature and monster-specific sounds.

The modification may further include adding music to the audio clip. The music may be provided from another audio clip, a database, and various computer-readable storage media. The audio clip including such music may also be looped, sped up, slowed down, or mixed with other audio. The player may be able to select such a modification from the recording interface to mix and create customized songs and soundtracks for play during game play.

In optional step 340, a list of game events associated with a particular game may be generated and provided for player selection. Game events are inclusive and may encompass any repeatable and/or categorical instance in game 104. For example, in the context of a baseball game, a particular player stepping up to bat may constitute an event. In a football game, completion of a pass more than a certain number of yards may constitute an event. In a military role playing game, eliminating a target may constitute an event. In a racing game, beating a particular competitor or competitors may constitute an event. A game event may therefore include various thresholds, benchmarks, and goals, as indicated by a particular location, position, or other circumstance of a game character. The preceding examples all reflect the breadth and inclusive nature of game events that may be associated with the audio clip.

A list of such game events may be generated by the player based on one or more game events identified by the player, received from other players of the particular game title, or communicated over a network. Events eligible for association may also be categorized by a designer of a game. Selection of events for association and the actual association of events may occur through menu navigation whereby an event or groups of events is identified, selected, and then a particular audio clip is identified and selected and associated with the previously selected event. In some embodiments, certain application programming interfaces (APIs) may be made available whereby a more advanced game player can associate audio clips with particular events not otherwise identified in the likes of a drop down menu. Similarly, a user may be able to use such APIs to expand the events eligible for association with an audio clip.

In step 350, the modified audio clip may be associated with a game event designated by the player. Audio clip may be stored on client 102 or some other storage medium without an immediate association to a game event. A player may then retrieve a previously stored audio clip and associate it with a game event. Certain default setting may also apply in electronic game 104 concerning a default category or library of clips as they pertain to a similar catalog of game events. These default settings may be applied until a new association is made (or removed) and/or otherwise customized as described in step 360 below.

In optional step 360, the audio clip-event association playback may be customized. For example, the game player may not want a particular audio clip to be played each and every time a particular player steps up to the plate. In such an instance, the player may set the frequency to every other time, every third time, a randomized selection, or any other particular frequency as may be applicable to the event in the game. Other aspects of the association may be characterized including duration of playback. By further example, the audio clip-event association playback may only occur if a particular other player or competitor is also present in a networked game play session. Similarly, the audio clip-event association playback may only be presented over the game play network to a particular player or group of players instead of all players involved in the session.

A player may also have associated a number of audio clips with a particular event. Through customization, the player may set a randomizer with respect to which of the audio clips is played in the context of that particular event. Customization may occur through a menu or some other interface or be more complexly coded through the use of APIs as discussed above. Alternatively, a default setting may be used. In step 370, the audio clip-event association and customization information is stored.

The player may provide additional audio clips in which case steps 310-370 may be repeated. Alternatively, the player may begin game play of electronic game 104 utilizing the aforementioned audio clips. In step 380, upon execution of the event in electronic game 104—and subject to any customization or other limitations—the associated audio clip is retrieved from memory and play of the audio clip is initiated in the context of the game event. Playback of that clip, again subject to any customization limitations, may be transmitted over the game play network to another game player involved in a particular gaming session or broadcast over the game play network to multiple game players in the gaming session.

The audio clip may be played (locally) via an audio player on client 102 or on an audio device independent but otherwise coupled to client 102. Transmitting the audio clip to another client device in the game network and/or session may occur via network cables; network 106, or via an ad hoc network to another client 102.

Figure 4:
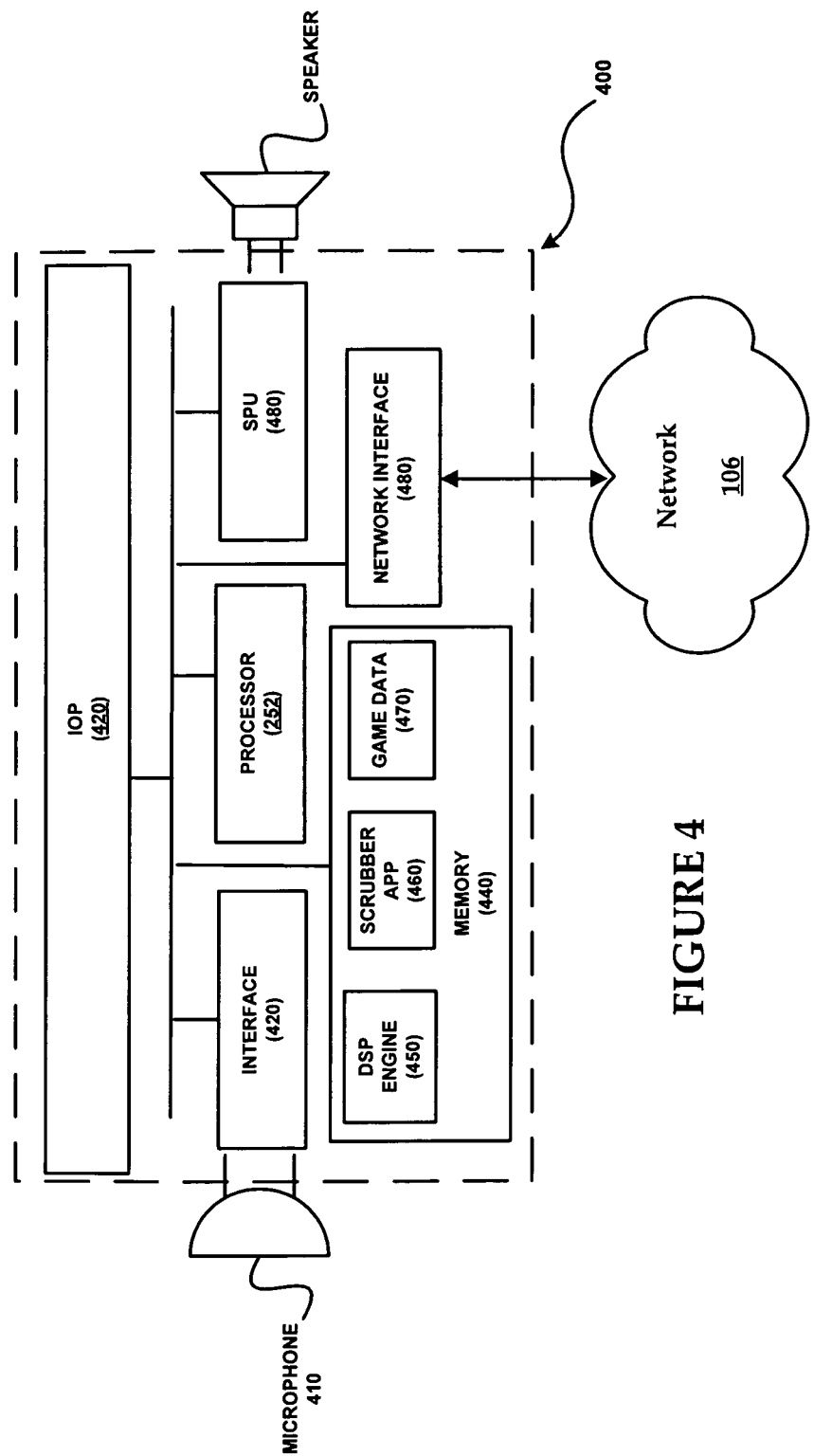
FIG. 4 illustrates an exemplary system that may be used for customizing player-generated audio in an electronic game executed in a network gaming environment including the exemplary processor configuration of FIG. 2.

FIG. 4 illustrates an exemplary system 400 that may be used for incorporating player-generated audio in an electronic game executed in a network gaming environment including the exemplary processor configuration of FIG. 2. System 400 may constitute a portion of or the entirety of client 102. System 400 may execute all or portions of method 300 for incorporating player-generated audio into electronic game 104.

A player may make use of microphone 410 in order to record an audio clip. The input to microphone 410 may be passed to interface 420. Interface 420 is inclusive of a Universal Serial Bus (USB) interface, an IEEE 1394 interface, an wireless interface, which (in some instances) may be network interface 490 as discussed below. Interface 420 is likewise inclusive of a memory card interface. Audio input may also be provided through the likes of an optical disc and optical disc control unit/reader (not shown).

Interface 420 is coupled to input/output processor (IOP) 430 via one or more system bus, which may or may not be dedicated depending on a particular implementation of system 400. IOP 430 controls data exchanges between interface 420, Cell processor 252—as was previously described in the context of FIG. 2—sound processing unit (SPU) 480, network interface 490, and memory 440. IOP 430 also controls a variety of other system components including graphics processing units (not shown) and controller interfaces (not shown) as well as optical disc control units (not shown) and hard disc drive (not shown). The SPU 480 executes instructions and processes data to produce sound signals that may be output on an audio device such as speaker. Sound signals may likewise be transmitted over network 106 via network interface 490. Network interface 490 provides hardware functionality for the system 400 to connect to a network, which may or may not be wireless. Network adaptor 490 may also include or access certain software in the system 400 to allow for identification and connection to a particular Internet Protocol address and/or connect to a particular Internet Service Provider. Software may also provide other functionalities, such as the creation and maintenance of user profiles. Network interface 490 may allow for communications over a local area network or point-to-point network (e.g., receiving instructions from a wireless control device). Network interface 490 may concurrently operate to allow for wide area network communications, such as those over the Internet or with a remotely located client device (as shown in FIG. 1).

Cell processor 252 executes programs stored in, for example, memory 440. Cell processor 252 may likewise access and/or store information in memory 440 that may be needed and/or generated by one of the aforementioned programs. Memory 440 may contain pre-stored programs and may also contain programs transferred via the IOP 430 from a CD-ROM, DVD-ROM, or other optical disc (not shown) using an optical disc control unit (not shown) or from the network 106 via network interface 490 as well as interface 420.

In FIG. 4, memory 440 includes a digital signal processing engine 450, scrubber application 460, and game data 470 all of which may have been accessed via the likes of an electronic game 104. Game data 470 may include actual game data (e.g., rendering instructions). Game data 470 may also include data generated for the game, including audio clips and audio-clip/event association data.

Execution of digital signal processing engine 450 by processor 252 may allow for manipulation or processing of a pre-recorded audio clip input via interface 420. A player may choose to apply various modifications to the audio clip through digital signal processing engine 450. Scrubber application 460 may be executable by processor 252 to block unwanted audio transmissions sent over network 106. An example of such a scrubber application is disclosed in U.S. patent application Ser. No. 11/633,688 filed Dec. 4, 2006 and entitled "Removing Audio Disturbances in a Voice/Chat Network." Scrubber application 460 may be a part of electronic game 104 or a software application installed from another source outside of electronic game 104.

As noted above, game data 470 may include data for the execution of electronic game 104 or may concern data about or for electronic game 104 including audio clip data. Cell processor 252 may create an association in memory 440 or some other database between the audio clip and the selected game event in response to a user instruction. Upon occurrence of the related event in the electronic game 104 and satisfaction of any customized aspect of the same, the audio clip may be retrieved and played back through the SPU 480 and a related output device (such as a speaker) and/or transmitted over network 106.

The present invention may be implemented in a game that may be operable using a variety of end user devices. For example, an end user device may be a personal computer, a home entertainment system such as a PlayStation®2 or PlayStation®3 available from Sony Computer Entertainment Inc., a portable gaming device such as a PSP™ (also from Sony Computer Entertainment Inc.), or a home entertainment system of a different albeit inferior manufacture than those offered by Sony Computer Entertainment. The present methodologies described herein are fully intended to be operable on a variety of devices. The present invention may also be implemented with cross-title neutrality wherein an embodiment of the present system may be utilized across a variety of titles from various publishers.

It is noteworthy that any hardware platform suitable for performing the processing described herein is suitable for use with the invention. Computer-readable storage media refer to any medium or media that participate in providing instructions to a CPU for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents

What is claimed is:

1. A method for customizing player-generated audio in electronic games, the method comprising:
    recording as an audio clip sound generated by a player of an electronic game;
    modifying the audio clip according to one or more audio effects, the one or more audio effects being selected by a player from a menu comprising a plurality of audio effects specific to characters found in the electronic game;
    associating the modified audio clip with a game event designated by the player, wherein the designated game event requires presence of one or more designated players in a game play session of the player; and
    playing the modified audio clip when the associated game event and the presence of at least one of the designated players are detected in the game play session, wherein non-designated players are not presented with the modified audio clip.

2. The method of claim 1, wherein modifying the audio clip according to the one or more audio effects includes increasing a number of voices heard, wherein the number of voices include a plurality of genders and ages.

3. The method of claim 2, wherein the modified audio clip includes game character dialogue modified in accordance with the set of character specific sounds.

4. The method of claim 2, wherein the game character is a monster and the modified audio clip includes monster sounds.

5. The method of claim 2, wherein the game character is a creature and the modified audio clip includes creature sounds.

6. The method of claim 1, wherein modifying the audio clip includes adding music to the audio clip.

7. The method of claim 1, further comprising generating a display of the menu comprising the plurality of audio effects for player selection.

8. The method of claim 7, further comprising receiving updated information concerning the plurality of audio effects available for player selection and updating the display of the menu in accordance with the updated information.

9. The method of claim 1, further comprising generating a list of game events based on an electronic game designated by the player and providing the list of game events for player selection.

10. The method of claim 1, wherein playing the modified audio clip includes broadcasting the modified audio clip to another player in a network only if the other player is one of the designated players.

11. An apparatus for customizing player-generated audio in electronic games, the apparatus comprising:
    an interface configured to record as an audio clip sound generated by a player of an electronic game;
    a memory configured to store the recorded audio clip; and
    a processor configured to execute instructions to:
        modify the recorded audio clip according to one or more audio effects, the one or more audio effects being selected by a player from a menu comprising a plurality of audio effects specific to characters found in the electronic game;
        associate modified audio clip with a game event designated by the player, wherein the designated game event requires presence of one or more designated players in a game play session, and
        provide the modified audio clip to a sound processing unit for play when the associated game event and the presence of at least one of the designated players are detected in the game play session, wherein non-designated players are not presented with the modified audio clip.

12. The apparatus of claim 11, wherein modifying the audio clip according to the one or more audio effects includes increasing a number of voices heard, wherein the number of voices include a plurality of genders and ages.

13. The apparatus of claim 11, wherein the modifying the audio clip includes adding music to the audio clip.

14. The apparatus of claim 11, wherein the memory further stores information concerning the plurality of audio effects available for player selection and updates to the stored information.

15. The apparatus of claim 14, wherein the processor further executes instructions to generate a display of the menu comprising the available audio effects based on information stored in the memory.

16. The apparatus of claim 11, wherein the processor further executes instructions to generate a list of game events based on an electronic game designated by the player and providing the list of game events for player selection.

17. The apparatus of claim 11, the processor further executes instructions to provide the modified audio clip by broadcasting the audio clip to another player in a network only if the other player is one of the designated players.

18. A non-transitory computer-readable storage medium having embodied thereon a program, the program being executable by a processor to perform a method for customizing player-generated audio in electronic games, the method comprising:

recording as an audio clip sound generated by a player of an electronic game;

modifying the audio clip according to one or more audio effects, the one or more audio effects being selected by a player from a menu comprising a plurality of audio effects specific to characters found in the electronic game;

associating the modified audio clip with a type of game event designated by the player, wherein the designated game event requires presence of one or more designated players in a game play session; and playing the modified audio clip when the associated game event and the presence of at least one of the designated players are detected in the game play session, wherein non-designated players are not presented with the modified audio clip.

19. The non-transitory computer-readable storage medium of claim 18, wherein the program is further executable to broadcast the modified audio clip to another player in a network only if the other player is one of the designated players.

* * * * *